Figure 1:
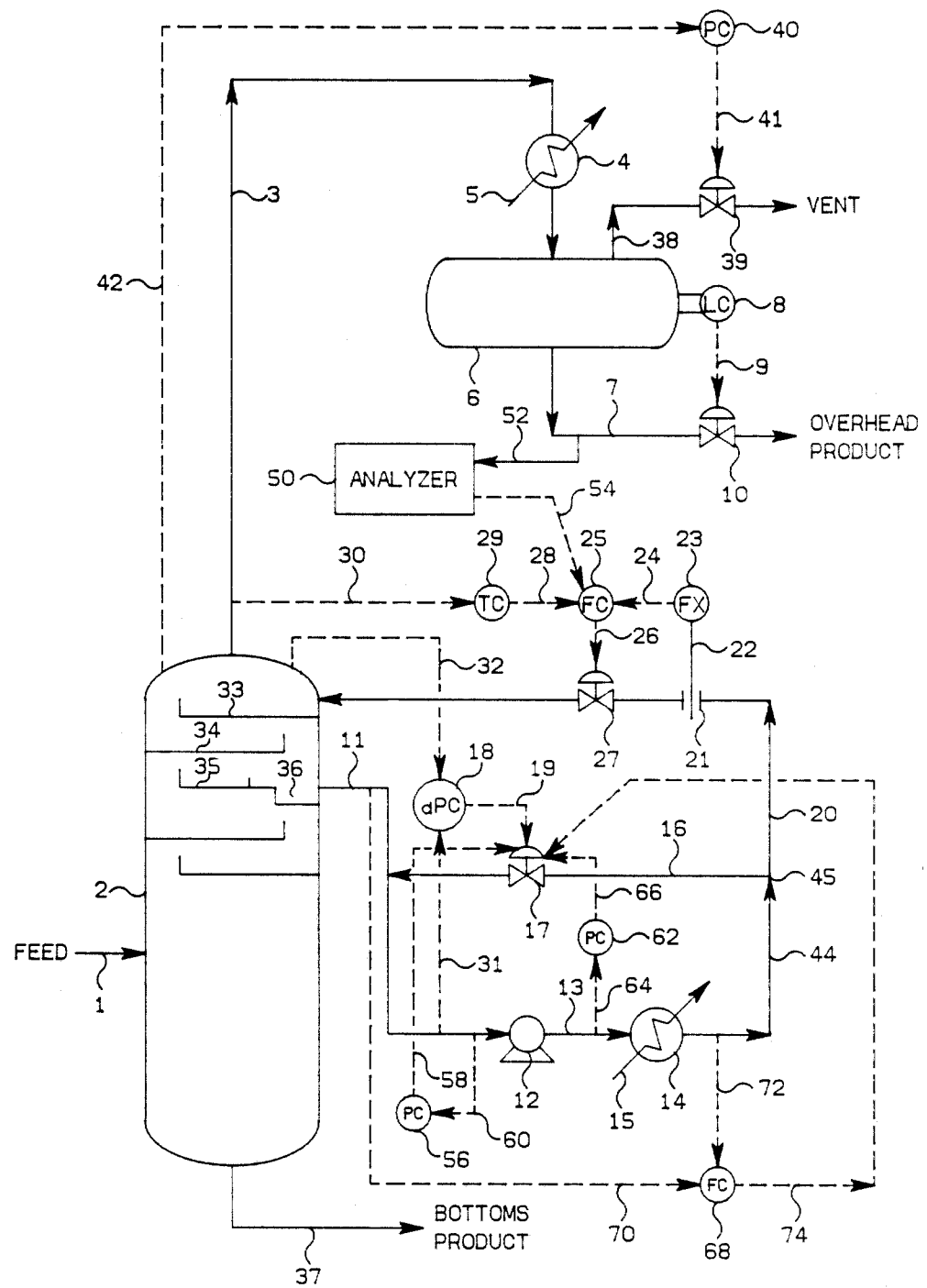

United States Patent [19]

Olson

[11] Patent Number: 4,746,407

[45] Date of Patent: May 24, 1988

[54] FRACTIONATOR REFLUX PUMP METHOD AND APPARATUS

[75] Inventor: John S. Olson, Borger, Tex.

[73] Assignee: Phillips Petroleum Company, Bartlesville, Okla.

[21] Appl. No.: 17,284

[22] Filed: Feb. 20, 1987

[51] Int. Cl.⁴ ............................................. B01D 3/42
[52] U.S. Cl. ............................................. 203/1; 203/2; 203/3; 203/98; 203/DIG. 7; 203/DIG. 19; 62/37; 62/41; 196/132; 202/160; 208/358; 208/DIG. 1
[58] Field of Search ............ 203/94, 98, 99, DIG. 19, 203/DIG. 7, 1-3, 26, 24; 202/160-162; 196/100, 99, 132; 62/33, 28, 21, 37; 208/358, DIG. 1; 159/DIG. 40

[56] References Cited

U.S. PATENT DOCUMENTS

| | | | |
|---|---|---|---|
| 3,229,471 | 1/1966 | Palen et al. | 62/21 |
| 3,257,372 | 6/1966 | Moon | 203/71 |
| 3,475,288 | 10/1969 | Ezzell | 203/1 |
| 4,139,420 | 2/1979 | Stünkel | 203/DIG. 19 |
| 4,303,478 | 12/1981 | Field | 203/26 |
| 4,427,420 | 1/1984 | Reid | 55/18 |
| 4,557,806 | 12/1985 | Stengle et al. | 203/1 |
| 4,559,108 | 12/1985 | Ahlberg | 203/26 |
| 4,640,743 | 2/1987 | Bannon et al. | 203/98 |

Primary Examiner—Wilbur Bascomb
Attorney, Agent, or Firm—Williams, Phillips & Umphlett

[57] ABSTRACT

In a fractional distillation process, the operation of a reflux pump in the process is enhanced by providing that liquid discharged from the reflux pump is returned directly to the reflux pump suction during the periods when the liquid reflux supply from the fractional distillation process is not sufficient to keep the reflux pump in constant operation.

30 Claims, 2 Drawing Sheets

FRACTIONATOR REFLUX PUMP METHOD AND APPARATUS

This invention relates to an improved method and apparatus for controlling fractional distillation columns. In one aspect, this invention relates to an improved method and apparatus for maintaining a reflux pump in constant operation during column start-up.

Fractional distillation columns are employed in many processes to make desired separations. The separations may range from single component separations to the more complex multiple separations performed by crude distillation towers. Typically, a feed stream containing at least first and second components is supplied to the fractional distillation column. A substantial portion of the first component contained in the feed stream is removed from the fractional distillation column as an overhead product and a substantial portion of the second component in the feed stream is removed from the fractional distillation process as a bottoms product. Heat is generally supplied to the fractional distillation column in order to effect the desired separation or the feed may be preheated.

In many fractional distillation processes such as crude distillation, fractionation of the effluent from a catalytic cracker and fractionation of the effluent from hydrodesulfurization reactors, a plurality of sidedraw streams will be withdrawn in addition to the overhead stream and the bottoms stream. In some modes of operation it is desired to cool a portion of the overhead vapor stream and return the cooled portion back to the distillation column as a liquid reflux. In other modes of operation it is desired to withdraw liquid directly from the distillation column, cool the liquid and then return the cooled liquid back to the distillation column as reflux. In such systems where reflux is returned to the distillation column, it is common to provide the energy necessary to return the liquid to the column by means of a pump. Many times, however, during column start-up when liquid and vapor flow rates are unsteady, the amount of liquid available to be returned to the column will vary over time, causing operational problems with the pump. For example, the pump may cavitate when the amount of liquid available to the pump becomes low or the pump may run dry and possibly overheat if there is no liquid available at the pump suction. Once a pump has run dry, it may not be possible to get the pump to move liquid again until all of the gas in the pump and the suction line to the pump is removed.

It is thus an object of this invention to provide a method and apparatus to insure that there is always liquid available to the reflux pump even during times of unsteady state column operation. It is also an object of this invention to provide a method and apparatus whereby the reflux pump can be maintained in constant operation during the start-up period in a fractional distillation process.

In accordance with the present invention, a method and apparatus are provided whereby liquid discharged from a reflux pump is returned to the column only when enough liquid is available to the pump suction to keep the pump in operation and at all other times the liquid discharged from the pump is routed back to the pump suction.

Other objects and advantages of the invention will be apparent from the foregoing brief description of the invention as well as the detailed description following.

Figure 2:
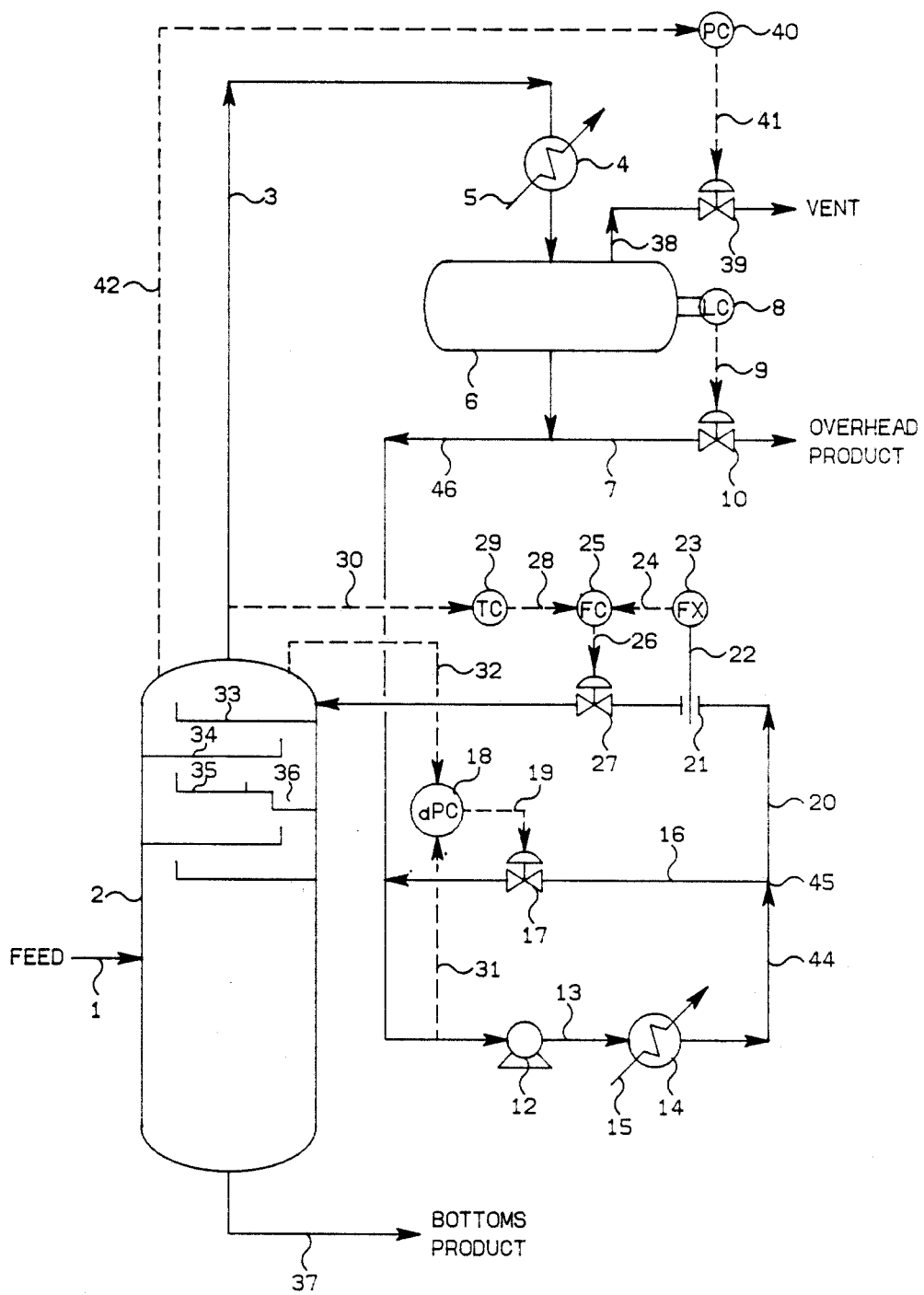

In the drawings, forming a part hereof, wherein like reference characters denote like parts in the various views, FIG. 1 is a diagrammatic representation of a fractional distillation column and the associated equipment and control system, and FIG. 2 is a diagrammatic representation of a similar fractional distillation column in which liquid reflux is supplied from condensed overhead vapors.

The invention is illustrated in terms of a fractional distillation process in which a feed stream is fractionated into an overhead product and a bottom product. The invention is, however, applicable to any fractional distillation process where one or more sidedraw product streams are withdrawn from the fractional distillation process. Also, the invention is illustrated in terms of a fractional distillation process in which the heat necessary to the process is supplied by the feed stream, but the invention is also applicable to a fractional distillation process where heat is supplied to the bottom of the column.

Referring now to FIG. 1, there is illustrated a fractional distillation column 2. A feed stream is provided to the fractional distillation column 2 through conduit 1. The feed flowing through conduit 1 may be preheated and/or additional heat may be provided to the fractional distillation column by circulating steam or other heating fluids through the lower portion of fractional distillation column 2. Trays 33, 34 and 35 are representative of the trays positioned inside distillation column 2 to provide liquid holdup for contact with raising vapors in distillation column 2.

A bottoms product stream containing a material with a boiling point higher than the boiling point of the feed is withdrawn from fractional distillation column 2 through conduit 37.

An overhead vapor stream having a boiling point lower than the feed stream is withdrawn from the upper portion of distillation column 2 through conduit 3. The overhead vapor stream flowing through conduit 3 is provided to condenser 4. Condenser 4 is provided with a cooling fluid through conduit 5. The at least partially condensed fluid stream from condenser 4 is provided to the overhead accumulator 6 through conduit 43. Liquid in accumulator 6 is removed through conduit 7 as the overhead product. Valve 10, positioned in conduit 7, is manipulated by liquid level controller 8 which sends signal 9 to valve 10 to maintain the liquid level in accumulator 6 at a desired setpoint. Any uncondensed vapor remaining in accumulator 6 is withdrawn through conduit 38. Valve 39, positioned in conduit 38, is manipulated by pressure controller 40, which senses the pressure in an upper portion of distillation column 2 through signal 42, and sends signal 41 to valve 39 to maintain the pressure in an upper portion of distillation column 2 at a desired setpoint.

Liquid distillate held upon tray 35 is withdrawn from distillation column 2 at sump area 36 through conduit 11. Liquid distillate in conduit 11 is provided to the inlet of pump 12 and pump 12 is situated so that the inlet to pump 12 is at an elevation lower than the bottom of tray 35 so that liquid distillate may flow through conduit 11 by force of gravity.

Within pump 12 the pressure of the liquid distillate is increased so that a liquid distillate of increased pressure is withdrawn from the outlet of pump 12 through conduit 13. The liquid distillate of increased pressure is provided to cooler 14 through conduit 13. Cooler 14 is provided with a cooling fluid through conduit 15, and a cooled liquid distillate stream is withdrawn from cooler 14 through conduit 44. Cooled liquid distillate in conduit 44 is provided to conduit junction area 45.

Cooled liquid distillate may be withdrawn from conduit junction area 45 and provided to an upper portion of distillation column 2 through conduit 20 as reflux. Flow sensor 21, operably located in conduit 20, provides a signal 22 to flow transducer 23. Signal 22 is representative of the actual flow rate of cooled liquid distillate through conduit 20. Flow transducer 23 provides signal 24, which is representative of the actual flow rate of cooled liquid distillate through conduit 20, to flow controller 25.

Signal 30, which is representative of the temperature of the overhead vapor in conduit 3, is provided to temperature controller 29. Temperature controller 29 provides signal 28, which is representative of the desired flow rate of the cooled liquid distillate through conduit 20, to flow controller 25. In response to signals 28 and 24, flow controller 25 provides an output signal 26 which is responsive to the difference between signals 28 and 24. Signal 26 is scaled so as to be representative of the position of control valve 27, which is operably positioned in conduit 20, required to maintain the actual flow rate of the cooled liquid distillate equal to the desired flow rate represented by signal 28.

It is considered to be within the scope of this invention that other methods known in the art for determining a signal representative of the desired flow rate of cooled liquid distillate through conduit 20 would be applicable in this invention. One method commonly used to calculate this desired reflux flow rate consists of analyzing in analyzer 50 the composition of the overhead product stream through conduit 52, comparing the actual composition of the overhead product stream to a desired setpoint composition and calculating a signal 54 representative of the desired reflux flow rate based on the difference between the actual composition and the desired composition of the overhead product stream.

When there is not enough liquid in pump area 36 and conduit 11 to keep pump 12 in smooth and constant operation, cooled liquid distillate may be withdrawn from conduit junction area 45 through conduit 16 and provided to conduit 11 which in turn provides the cooled liquid distillate to the inlet of pump 12.

Signal 31, which is representative of the pressure at the inlet of pump 12, and signal 32, which is representative of the pressure in an upper portion of distillation column 2, are both provided to differential pressure controller 18. In response to signals 31 and 32, differential pressure controller 18 provides an output signal 19 which is responsive to the difference between signals 31 and 32. When the difference between signals 31 and 32 decreases to a preset minimum value, signal 19 is provided to open the otherwise normally closed valve 17, which is operably positioned in conduit 16.

The preset minimum value provided to differential pressure controller 18 can be determined from operating experience with the system so that valve 17 opens when pump 12 begins to run dry, or it may be calculated to be equal to the pressure that would be exerted at the bottom of a column of liquid distillate with a height equal to the difference between the elevation at the inlet to pump 12 and the elevation at the point where conduit 11 joins distillation column 2.

It is considered to be within the scope of this invention that there are ways other than measuring the differential pressure between the inlet to pump 12 and the upper portion of distillation column 2 which would suffice in determining when to open valve 17 in order to prevent pump 12 from running dry. The mode shown in FIG. 1 is considered the best mode for determining when to open valve 17 but other criteria for determining when to open valve 17 include, among others, the pressure (60, 56, 58) at the inlet to pump 12, the pressure (64, 62, 66) at the outlet of pump 12, or by flow controller 68 and signal 74 responsive to the difference between the flow rate 70 of liquid distillate in conduit 11 and the flow rate 72 of cooled liquid distillate in conduit 44.

The system shown in FIG. 1 is generally operated under steady state conditions where temperatures, pressures and flow rates at any given point remain constant over time. During this normal period of operation, the amount of liquid distillate in sump area 36 is sufficient to keep pump 12 in constant operation, and no cooled liquid distillate would flow through conduit 16 since valve 17 would remain closed. During start-up of the system however, it may take several hours before the temperatures in column 2 reach steady state. During this start-up period, the amount of liquid available in sump area 36 on tray 35 will at some times be sufficient to supply pump 12 with liquid distillate and at other times be insufficient. In prior methods of operation, when the amount of liquid available in sump area 36 is not sufficient to keep pump 12 in operation, pump 12 would be shut-off or else sustain damage. The starting and stopping of pump 12 causes additional wear and tear on pump 12 and also requires additional manpower to attend to pump 12 during start-up.

When the apparatus and method of this invention are used however, once a first amount of liquid has collected in sump area 36 and filled conduit 11, pump 12 can safely be started and left unattended during the remaining start-up period. When sump area 36 becomes dry, the difference in pressure between the inlet to pump 12 and an upper portion of distillation column 2 will decrease, thus triggering the opening of valve 17. With valve 17 open, all of the cooled liquid distillate in conduit 44 will pass back to the inlet of pump 12 through conduit 16.

In order to insure that liquid flow by gravity through conduit 20 does not occur when valve 17 is open, the elevation of conduit junction 45 and the elevation of the point where conduit 16 joins conduit 11 should both be less than the elevation of the point where conduit 20 joins distillation column 2.

Referring now to FIG. 2, there is illustrated a fractional distillation system similar in all respects to the system shown in FIG. 1 except that liquid is supplied from accumulator 6 to the inlet of pump 12 through conduit 46.

During start-up, the amount of liquid available in accumulator 6 may not always be sufficient to keep pump 12 in constant operation even though valve 10 remains closed. When the amount of liquid in accumulator 6 is not sufficient to keep pump 12 in operation, the difference between the pressure at the inlet to pump 12 and the pressure in an upper portion of distillation column 2 will decrease and trigger the opening of valve 17. With valve 17 thus opened, the liquid discharged from the outlet of pump 12 will be returned through conduits 13, 44, 16 and 46 back to the inlet of pump 12 until enough liquid is available in conduit 46 and accumulator 6 to cause valve 17 to close. When valve 17 closes the liquid discharged from the outlet of pump 12 will be provided to distillation column 2 as reflux through conduit 20.

It is considered to be within the scope of this invention that the opening of valve 17 could, alternatively, be triggered by the difference between the pressure in accumulator 6 and the pressure at the inlet of pump 12.

EXAMPLE

A fractional distillation system of the type illustrated in FIG. 1, except that provisions were made for the withdrawal of several intermediate sidedraw streams, was utilized to fractionate a feed stream comprised mostly of the product from a petroleum refinery catalytic cracking unit and a minor amount of various other refinery hydrocarbon streams. In the prior method of operation conduit 16 did not exist so that all material withdrawn from distillation column 2 was required to be returned to distillation column 2 through conduit 20. During the start-up period in the prior method of operation, over seventeen hours elapsed between the time feed was started to distillation column 2, and the time that the product streams were of sufficient quality to be sent to refinery storage. At least one person was required to attend pump 12 during this period, starting pump 12 when liquid was available at the inlet to pump 12 and stopping pump 12 when pump 12 ran dry.

With the installation of the inventive equipment, conduit 16, valve 17 and differential pressure controller 18, only eight hours elapsed between the time feed was started to distillation column 2 and the time the product streams were of sufficient quality to be sent to refinery storage. Also, during the inventive run, it was possible to start pump 12 and let it run unattended for the entire start-up period. A summary of the operating conditions during the prior method run and the inventive run are set forth in the Table.

TABLE

| | Prior Method | Invention |
|---|---|---|
| Feed Temp., °F. | 921 | 913 |
| Column Top Temp., °F. | 243 | 256 |
| Column Bottom Temp., °F. | 658 | 656 |
| Accumulator Temp., °F. | 76 | 68 |
| Feed Rate, lb/hr | 509,111 | 359,198 |
| Reflux rate, Bbl/hr | 2457 | 1995 |

That which is claimed is:

1. An apparatus comprising a fractional distillation column, first conduit means for introducing into said column a feed stream to be fractionated, second conduit means connected in communication with a lower portion of said column for withdrawal of a bottoms product stream, a condenser having an inlet and an outlet, third conduit means connected between an upper portion of said column and said inlet of said condenser, an accumulator having an inlet, a liquid outlet and a vapor outlet, fourth conduit means connected between said condenser outlet and said accumulator inlet, fifth conduit means connected in communication with said accumulator vapor outlet, first valve means operatively positioned in said fifth conduit means, means for manipulating said first valve means, sixth conduit means connected in communication with said accumulator liquid outlet for withdrawal of an overhead product stream, second valve means operatively positioned in said sixth conduit means, means for manipulating said second valve means, a pump having an inlet and an outlet, a means connected between said pump inlet and an upper portion of said column for withdrawal of a fluid distillate stream, a cooler having an inlet and an outlet, seventh conduit means connected between said cooler inlet and said pump outlet, a conduit junction having an inlet, a first outlet and a second outlet, eighth conduit means connected between said conduit junction inlet and said cooler outlet for withdrawal of a cooled fluid distillate stream, ninth conduit means connected between said conduit junction first outlet and an upper portion of said column for the return of said cooled fluid distillate stream to said column, third valve means operatively positioned in said ninth conduit means, means for manipulating said third valve means, a tenth conduit means connected between said conduit junction second outlet and said pump inlet, fourth valve means operatively positioned in said tenth conduit means, and means for manipulating said fourth valve means.

2. An apparatus in accordance with claim 1 wherein said means for manipulating said third valve means is responsive to the composition of said overhead product stream.

3. An apparatus in accordance with claim 1 wherein said means for manipulating said third valve means is responsive to the temperature in an upper portion of said column.

4. An apparatus in accordance with claim 1 wherein said means for manipulating said fourth valve means is responsive to the difference between the pressure in an upper portion of said column and the pressure at said pump inlet.

5. An apparataus in accordance with claim 1 wherein said means for manipulating fourth valve means is responsive to the difference between the rate at which said fluid distillate stream is withdrawn from said column and the rate at which said cooled fluid distillate stream is withdrawn from said cooler.

6. An apparatus in accordance with claim 1 wherein said means for manipulating said fourth valve means is responsive to the pressure at said pump inlet.

7. An apparatus in accordance with claim 1 wherein said means for manipulating said fourth valve means is responsive to the pressure at said pump outlet.

8. An apparatus in accordance with claim 1 wherein said means for manipulating said first valve means is responsive to the pressure in an upper portion of said column.

9. An apparatus in accordance with claim 1 wherein said means for manipulating said second valve means is responsive to the liquid level in said accumulator.

10. An apparatus in accordance with claim 1 wherein said means for withdrawal of a fluid distillate stream comprises an eleventh conduit means connected between an upper portion of said column and said pump inlet.

11. An apparatus in accordance with claim 10 wherein said means for manipulating said fourth valve means is responsive to the difference between the pressure in an upper portion of said column and the pressure at said pump inlet.

12. An apparatus in accordance with claim 11 wherein said means for manipulating said third valve means is responsive to the temperature in an upper portion of said column.

13. An apparatus in accordance with claim 12 wherein said means for manipulating said second valve means is responsive to the liquid level in said accumulator.

14. An apparatus in accordance with claim 13 wherein said means for manipulating said first valve means is responsive to the pressure in an upper portion of said column.

15. An apparatus in accordance with claim 1 wherein said means for withdrawal of a fluid distillate stream comprises said third conduit, said condenser, said fourth conduit, said accumulator and a twelfth conduit means connected between said accumulator liquid outlet and said pump inlet.

16. An apparatus in accordance with claim 15 wherein said means for manipulating said fourth valve means is responsive to the difference between the pressure in an upper portion of said column and the pressure at said pump inlet.

17. A method comprising passing a feed stream to be fractionated into a fractional distillation zone, withdrawing a bottoms product stream from a lower portion of said fractional distillation zone, withdrawing a vaporous overhead stream from an upper portion of said fractional distillation zone, passing said vaporous overhead stream into a condensing zone and therein at least partially condensing said vaporous overhead stream into a condensate, withdrawing said condensate along with any uncondensed portion of said vaporous overhead stream, passing said condensate and said any uncondensed portion of said vaporous overhead stream into an accumulation zone, withdrawing condensate from said accumulation zone as an overhead product stream, withdrawing an uncondensed portion of said vaporous overhead stream from said accumulation zone, passing a fluid distillate stream from an upper portion of said fractional distillation zone into a pumping zone and therein increasing the pressure of said fluid distillate stream, withdrawing said fluid distillate stream of increased pressure from said pumping zone, passing the thus withdrawn fluid distillate stream into a cooling zone and therein cooling said fluid distillate stream, withdrawing the thus cooled fluid distillate stream from said cooling zone, passing the thus withdrawn cooled fluid distillate stream to an upper portion of said fractional distillation zone as reflux only when the rate at which said fluid distillate stream is withdrawn from an upper portion of said fractional distillation zone is greater than or substantially equal to the rate at which said cooled fluid distillate stream is withdrawn from said cooling zone, and passing the thus withdrawn cooled fluid distillate stream back to said pumping zone when the rate at which said fluid distillate stream is withdrawn from an upper portion of said fractional distillation zone is substantially less than the rate at which said cooled fluid distillate stream is withdrawn from said cooling zone.

18. A method in accordance with claim 17 wherein, during the time said cooled fluid distillate stream is being passed to said upper portion of said fractional distillation zone, said cooled fluid distillate stream is passed at a rate responsive to the temperature in an upper portion of said fractional distillation zone.

19. A method in accordance with claim 17 wherein, during the time said cooled fluid distillate stream is being passed to said upper portion of said fractional distillation zone, said cooled fluid distillate stream is passed at a rate responsive to the composition of said overhead product stream.

20. A method in accordance with claim 17 wherein said condensate is withdrawn from said accumulation zone as an overhead product stream at a rate responsive to the liquid level in condensate in said accumulation zone.

21. A method in accordance with claim 17 wherein an uncondensed portion of said vaporous overhead stream is withdrawn from said accumulation zone at a rate responsive to the pressure in an upper portion of said fractional distillation zone.

22. A method in accordance with claim 17 wherein the difference between the rate at which said fluid distillate stream is withdrawn from an upper portion of said fractional distillation zone and the rate at which said cooled fluid distillate stream is withdrawn from said cooling zone is determined by measuring the difference between the pressure in an upper portion of said fractional distillation zone and the pressure at the entrance to said pumping zone.

23. A method in accordance with claim 22 wherein, during the time said cooled fluid distillate stream is being passed to said upper portion of said fractional distillation zone, said cooled fluid distillate stream is passed at a rate responsive to the temperature in an upper portion of said fractional distillation zone.

24. A method in accordance with claim 23 wherein said condensate is withdrawn from said accumulation zone as an overhead product stream at a rate responsive to the liquid level of condensate in said accumulation zone.

25. A method in accordance with claim 24 wherein an uncondensed portion of said vaporous overhead stream is withdrawn from said accumulation zone at a rate responsive to the pressure in an upper portion of said fractional distillation zone.

26. A method in accordance with claim 25 wherein said fluid distillate stream is withdrawn as a liquid from a tray in an upper portion of said fractional distillation zone.

27. A method in accordance with claim 26 wherein the feed stream to be fractionated is a stream comprising catalytically cracked hydrocarbons at a temperature above 850 degrees Fahrenheit.

28. A method in accordance with claim 27 wherein said method is used during the start-up period beginning when said feed stream is first passed to said fractional distillation zone.

29. A method in accordance with claim 17 wherein said fluid distillate stream is liquid condensate withdrawn from said accumulation zone.

30. A method in accordance with claim 29 wherein the difference between the rate at which said fluid distillate stream is withdrawn from an upper portion of said fractional distillation zone and the rate at which said cooled fluid distillate stream is withdrawn from said cooling zone is determined by measuring the difference between the pressure in said accumulation zone and the pressure at the entrance to said pumping zone.

* * * * *